Nov. 5, 1946.          B. H. S. CHAPPELL          2,410,427
                       TREATING OILS AND FATS
                       Filed April 23, 1943
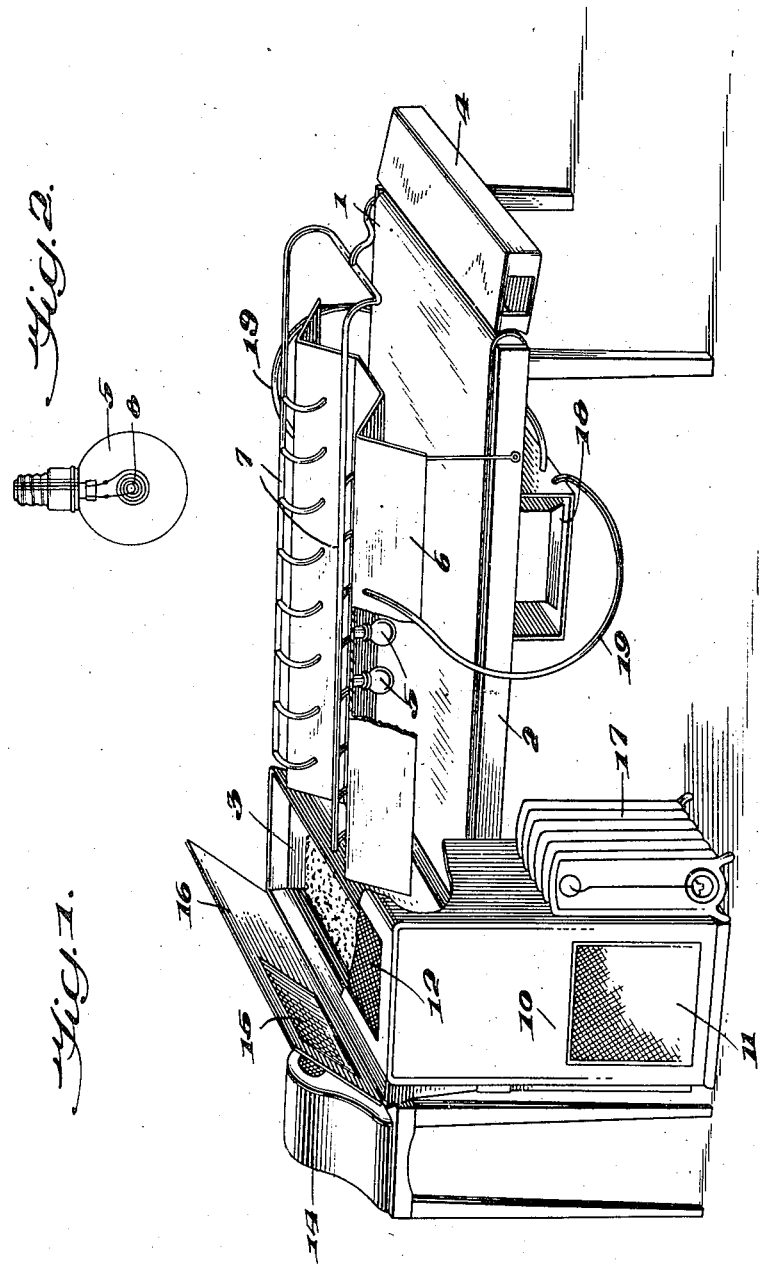

Patented Nov. 5, 1946

2,410,427

UNITED STATES PATENT OFFICE 2,410,427

TREATING OILS AND FATS

Bartlett H. Stafford Chappell, Hurley, N. Y.

Application April 23, 1943, Serial No. 484,272

2 Claims. (Cl. 99—65)

This invention relates to an improvement in processes for the treatment of fats and oils of foods, vegetable, animal, and mineral products.

The invention relates to the changing of the internal conditions in the substances mentioned, and more particularly to the treatment of the fats and oils composing these substances or contained therein, to produce a transformation in these products and to develop desirable characteristics therein, particularly for rendering the oils more soluble in digestive juices, and improving the flavor thereof, as well as the elimination of undesirable properties and characteristics, and the stabilization of desirable factors in these products.

The object of the invention is to improve the digestibility, taste and beneficial results of food and other products of the character mentioned. This process is carried out by exposing such products to the radiation of infra-red rays, the major portion of which are of wave lengths above 7700 Angstrom units, but with low heat radiation.

When the process is used in the treatment of coffee, for instance, it is not applied to the green coffee, but only to the coffee after it has been roasted. Likewise, in treating other substances and food products, it is usually applied thereto after any preliminary treatment required to render these products edible, or generally available for use.

The process is described in the treatment of coffee as an example, because it utilizes many desirable functions of the process, producing improved properties in the treated coffee that are highly desirable, as will be pointed out hereinafter.

When coffee is roasted, the oils are developed in the bean structure, making them available for use, but it has been known that delay in brewing the coffee after roasting allows these oils to become rancid, reducing their potency, and causing them to become less digestive. These oils are extremely delicate and volatile, and in treating them, it is essential to avoid, (a) raising the temperature thereof to the point of "frying"; (b) altering the character of the flavor through evaporation; (c) changing the identity of flavor by reroasting; and (d) changing the predetermined roast color.

This process subjects the oils to infra-red rays of a character nevertheless which does not approach roasting temperature, being below 200° F. Such treatment is given to the coffee not only after roasting has taken place and the coffee cooled, but beneficial results may be obtained thereby, even after the roasted coffee has become aged when it would otherwise be undesirable for use.

I have shown in the accompanying drawing, a form of apparatus suitable for use in practicing this process, in which:

Fig. 1 is a perspective view of conveyor structure and associated mechanisms for subjecting the products to infra-red rays under controlled conditions; and Fig. 2 is a side elevation of an infra-red ray lamp as used therein.

In practicing this process in the treatment of coffee, I prefer to utilize a combination of devices which will not only subject the products to infra-red rays, but will also so condition the air in the room where the treatment is being conducted that the most desirable results may be obtained. An example of such apparatus is shown in Fig. 1, in which a conveyor is designated generally by the numeral 1, being mounted on a table 2, and extending from a hopper 3 into which the products are to be placed. The conveyor discharges the products into an outlet device 4 which may direct them to receptacles or other point for further treatment or use.

Mounted over the conveyor 1 are a plurality of lamps 5, which are shown as provided with reflectors 6 thereover and having a source of electric current 7 connected with the respective lamps. Each of these lamps 5 is preferably of the character shown in Fig. 2, in which the lamp is shown as comprising an evacuated envelope containing a gaseous atmosphere in which is mounted a carbon filament 8, capable of emitting infra-red rays, the major portion of which are above 7700 Angstrom units, but without material heat radiation. For this purpose, an incandescent lamp using a carbon filament will produce the desired radiation of infra-red rays that will penetrate deeply into the food products, and I have found in practice that effective treatment may be had to a depth of 2½ inches on the conveyor.

While an endless power driven belt conveyor is shown, it will be evident that other types of conveying means may be utilized, such for instance, as the conventional scalping and grading shoe, for the purpose of moving the coffee or other products along through the infra-red rays from the lamps 5.

The lamps 5 may be mounted in one or more banks beneath the reflectors 6. It is preferred to use banks of clear, frosted, and colored lamps of two hundred watt, fifty candle-power at the intake end of the conveyor, and also a number of one hundred and twenty and one hundred watt, thirty-two candle-power, colored lamps at the discharge end of the conveyor. These lamps include blue, ruby, orange-amber, smoke, yellow, green, frosted and clear. Lamps of lower candle-power are included to avoid increased heat radiations due to color. When colored bulbs are not available, strips of colored glass may be arranged under clear bulbs of this type.

The treating apparatus will be located in a room where atmospheric conditions can be controlled automatically, both as to temperature and relative humidity, and also for the control of the oxygen content of the room. Such control units are well-known as to construction and operation and need be only generally referred to here.

Included in such controls is a humidifier, designated generally by the numeral 10, which is of conventional construction adapted to take air in through an intake 11, filter and condition its moisture content, and to discharge the same at 12 in the region of the coffee hopper 3, so that the coffee will be subjected to filtered air at the point where it is subjected to infra-red rays, inasmuch as such air aids the treatment materially.

It is preferred to discharge the air in the region of the coffee intake, so as to maintain a temperature of 70° F. with 60° of humidity, which makes an ideal atmosphere for the processing of the oils in the roasted coffee beans according to this process.

I have shown also an ozonator 14 of conventional construction which is intended to assist in supplying oxygen to the moisture conditioned air that is delivered to the coffee at the intake side of the treating equipment, to facilitate, when needed, the reaction of the coffee oils to the infra-red rays. The ozonator 14 discharges the treated air therefrom through a window 15 in an upwardly extending deflector 16 that extends beside the hopper 3, in the path of the air discharged at 12 from the air conditioner.

Provision should be made for maintaining the desired temperature conditions in the room, for which purpose I have shown an electrical steam radiator at 17 located adjacent the conveyor to supply heat thereto when needed or desired.

A refrigerating unit is shown at 18 intended to be used in localities where the outside temperature and humidity are high, not for the purpose of cooling the coffee but to supply a cooling medium to the lamps 5, so as to reduce the temperature thereof when required so as not to affect the coffee. For this purpose, blasts of air are directed from the refrigerating unit 18 through pipes 19 to the individual lamps and sockets to cool these, so as to maintain the desirable low temperature referred to above.

The coffee containing the oils to be treated should have been previously roasted and cooled to develop the oils. It may even be what is known as "stale" coffee, the oils of which can be rendered digestible by this process.

Before treating the coffee, the operator should first make certain that the atmospheric condition in the treating room is maintained at 70° F., with 60° of relative humidity, and that the conditioning units are functioning, if required.

Then the roasted coffee beans are deposited in the hopper 3 to move along the conveyor 1 through the infra-red rays emitting from the electrically energized (and cooled, if required) lamps 5. The speed at which the conveyor moves the coffee through the infra-red rays varies according to the type of coffee being processed. I have found in practice that the depth of the coffee beans may be as much as 2½ inches on the conveyor and yet be effectively treated.

Roasting temperature of coffee is above 100° C., and it is essential that coffee here treated shall be maintained below such roasting temperatures. I have found that best results are obtained between 190°–200° F. Any temperature approaching that used in roasting would alter the identity of that particular roast. This process does not affect the appearance of roasted coffee.

It is known that the chemical action of light depends upon the substance upon which the rays strike and not upon the chemical quality inherent in the rays themselves. The light from the incandescent lamps 5 strikes on and through the oils contained in the structure of the roasted coffee bean. The action of the infra-red rays from the lamps, attended by low heat radiation, so affects the oils that ordinary decomposition does not take place, and the coffee is thus rendered more digestible and of increased potency, while also delaying the development of rancidity.

This process may be applied to the treatment of fats and oils of any origin and of any form, including substances containing them at any time, either native to the substances or added thereto at any time, by the use of infra-red rays of the character described. Since coffee is one of the substances falling within this category, it is used as an example. However other substances of equal or greater importance and falling within this category are cocoa beans, spices, petroleum jelly, nut meats and the like.

I claim:

1. A process of treating coffee comprising the step of exposing said coffee after roasting to infra-red rays at a temperature below 200° F.

2. A process of developing the oils of roasted coffee to improve the digestibility and taste thereof, comprising roasting and then cooling the coffee, and thereafter exposing the roasted coffee to infra-red rays at a temperature below 200° F.

BARTLETT H. STAFFORD CHAPPELL.